April 29, 1952   D. M. WARBURTON   2,594,370
METHOD OF SEPARATING METAL HALIDES
Filed May 14, 1947
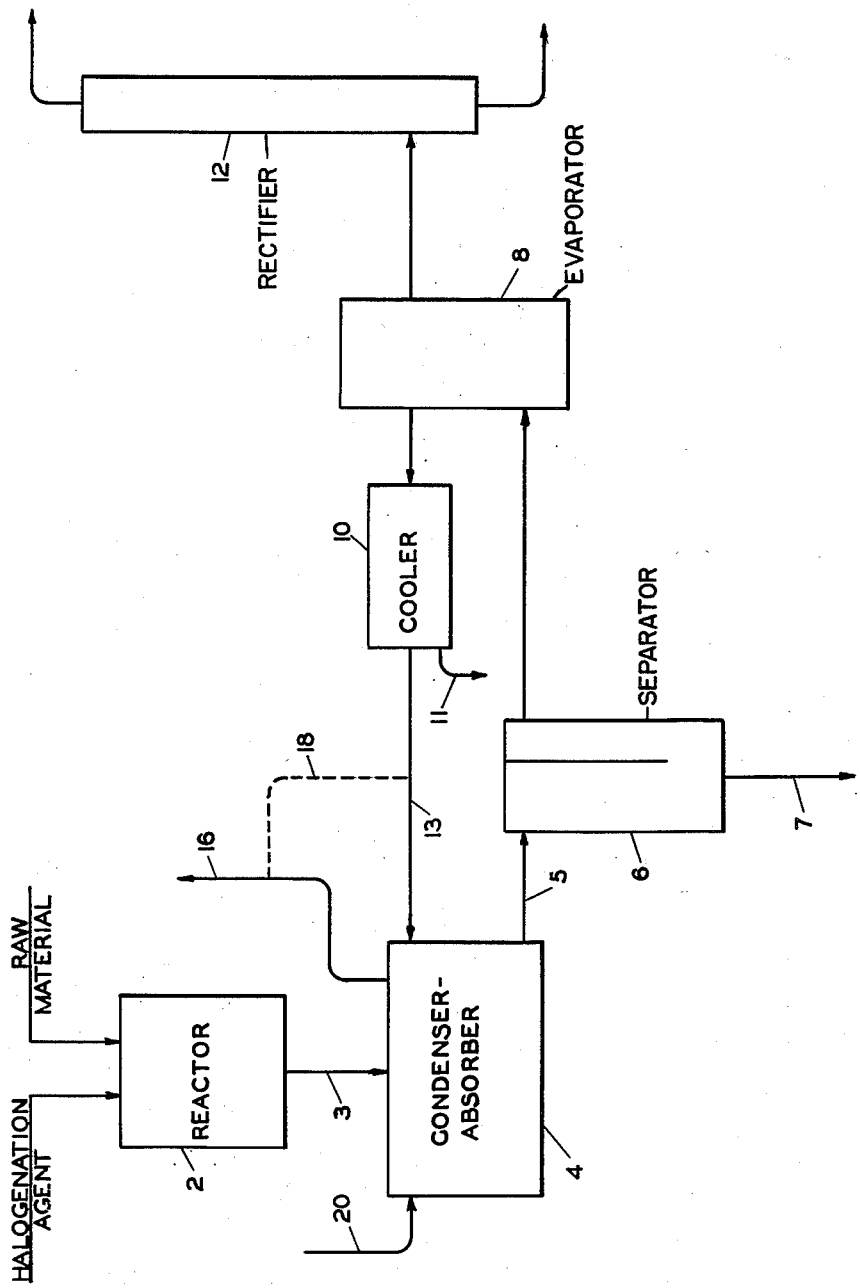
Inventor
DICK M. WARBURTON
By
Thornton F. Holder   Attorney Patented Apr. 29, 1952

2,594,370

UNITED STATES PATENT OFFICE 2,594,370

METHOD OF SEPARATING METAL HALIDES

Dick M. Warburton, Painesville, Ohio, assignor to Diamond Alkali Company, Cleveland, Ohio, a corporation of Delaware Application May 14, 1947, Serial No. 747,959

8 Claims. (Cl. 23—87)

This invention relates to a method of separating inorganic halogen compounds from each other and more particularly relates to a method of separating inorganic halides from each other by utilizing the preferential solubility of halogenatable organic liquids for certain inorganic halides. The invention has particular application in the separation of valuable components of a mixture of inorganic halides from each other, especially in the case where such mixture is derived from dry halogenation of an ore, metal, mixture of metals, alloy, or the like.

By dry halogenation is meant processes in which halogen compounds are obtained by halogenation reactions taking place under substantially anhydrous conditions and in which the halogenation agent is either elemental halogen or halogen yielding compounds.

Dry halogenation processes have heretofore been proposed for production of inorganic halogen compounds and more particularly metal halogen compounds of the elements of Groups III and IV of the Periodic Table. Such compounds have been obtained by the dry halogenation, with elemental halogen or halogen yielding compounds, of various mineral substances often mixed with a reducing agent, such as carbon. Clays, zircon, ilmenite, rutile, cassiterite, sassolite, sand, or the like may be used to obtain as reaction products such compounds as silicon tetrachloride, titanium tetrachloride, boron trichloride, and the like admixed with halides of aluminum and iron. It has also been proposed to halogenate with elemental halogen or halogen yielding compounds to obtain such inorganic halides, alloys, elements of groups III and IV in crude form, or physical mixtures of these elements and other elements, examples of which are silicon carbide, ferro-silicon, crude silicon, tin, boron, and the like. Dry halogenations of these substances generally yield fully halogenated compounds of the elements of groups III and IV, for example, silicon tetrachloride or bromide, tin tetrachloride, boron trichloride, etc., admixed with carbon, solid halides of iron, aluminum, and other substances present as impurities. In general, the group IV elements, and boron from group III, yield normally liquid chlorides or bromides, for example, silicon tetrachloride or bromide, titanium tetrachloride, tin tetrachloride or bromide, and boron trichloride, tribromide, or triiodide. These compounds represent particularly useful and valuable articles of commerce, especially as applied to organic syntheses.

Whether a mineral substance, an alloy, a physical mixture of elements, or an element in crude form is used as the raw material for the dry halogenation reaction, there is present the problem of separating the various components of the heterogeneous reaction product from each other. One method proposed for obtaining the desired halides of groups III and IV elements in pure form comprises the total condensation of the heterogeneous reaction products with subsequent distillation of the more volatile groups III and IV halides, such as silicon tetrachloride, therefrom and further separation of the less volatile impurities, such as ferric and aluminum chlorides, by distillation or sublimation. The principal disadvantages of this method are that incomplete separation is usually obtained and in any event, there are several intermittent time-consuming separation steps which do not permit economy of operation.

A second method for the separation of the products of such dry halogenation has been proposed, which comprises the condensation of the normally solid halides, such as the halides of iron and aluminum, at temperatures above the boiling points of the more volatile groups III and IV halide components, followed by separate condensation of the volatile groups III and IV halides, such as silicon tetrachloride or other normally liquid halides of these groups. The disadvantage of this method lies in the fact that appreciable amounts of halides of impurities, such as ferric chloride, remain in suspension in the vapor stream issuing from the initial condensing zone causing plugging of the conduits leading to the secondary condensing zone, as well as deposit of such materials on the condensing surfaces of such secondary condensing zone.

A third method for separating the products of a dry halogenation has been proposed, which comprises conducting the vapor stream of heterogeneous reaction products over cooled surfaces, whose temperatures are carefully controlled to allow the fractional condensation thereon of the halides of iron and aluminum while keeping the temperature sufficiently high to maintain the vapor phase of the more volatile components, such as titanium and silicon tetrachloride. This step is then followed by a total condensation of the more volatile groups III and IV halide materials and their subsequent rectification by fractional distillation. Thereafter, any volatile impurities are removed from each fraction by a separate step. This method also has the disadvantage of carrying along in the vapor stream from the initial condensing zone appreciable amounts of the easily sublimed ferric halides. This is particularly true when the ferric halide is ferric chloride. This material generally deposits from a vapor stream in which it is carried upon the inner walls of conduits of an apparatus, eventually causing stoppage thereof and making it necessary to cease operations and remove the deposit from the conduits and surfaces before production can be resumed.

Still another method, which has been proposed for the separation of the products of a dry chlorination of tin and titanium containing ores, comprises condensing a major portion of the ferric chloride present in the vapor stream of reaction products issuing from the reactor upon surfaces having scrapers attached thereto to remove the ferric chloride, the surfaces being maintained above the boiling points of titanium and tin tetrachloride and below the vaporization temperature of ferric chloride. The ferric chloride, which remains in the vapor stream, is removed by scrubbing the vapors with a spray of liquid inorganic halides (stannic chloride or titanium tetrachloride) or halogenated organic compounds. The scrubbing liquor is subsequently rectified to recover the titanium and tin tetrahalides. This method has the distinct disadvantage of requiring the scraping mechanism to remove the ferric chloride from the surfaces of the first condenser. This additional equipment adds appreciably to the cost of operation and maintenance of the bulky apparatus.

The last mentioned prior art method, as well as the other prior art methods mentioned above, makes no provision for the removal of excess halogenation agent entrained in the reaction mass. Such excess halogenation agent comprises an additional impurity soluble in the reaction mass which must be removed from the desired products.

The present invention provides a simple and continuous method for the separation of volatile halides of groups III and IV from undesired halide impurities while simultaneously removing entrained unreacted halogenation agent, such as elemental halogen, without the necessity of providing complicated mechanical means to accomplish the separation and without the necessity of numerous steps in the removal of the volatile soluble impurities.

The method of the present invention comprises the steps of contacting the reaction products from a dry halogenation of inorganic materials with a halogenatable organic liquid which is chemically indifferent to all of the inorganic halide reaction products, said organic liquid having preferential solubility for at least one of said reaction products, separating any solid phase insoluble in said solvent, and then separating the soluble inorganic halide materials from said liquid organic material. The invention also contemplates the halogenation of the organic liquid employed and includes the various advantages which arise therefrom.

The method of the present invention may conveniently be carried out in any suitable apparatus, it being an advantage of this invention that no specialized type of construction is required in the separating vessels and the like required to the performance of the invention. Accordingly, and in order to aid those skilled in the art in the practice of the present invention, the practice of the method is described only with reference to a flow-sheet of a reaction train which has been found particularly useful.

Referring to the drawing, the single figure is a diagrammatic showing in flow-sheet form of an apparatus particularly adapted for use in the separation of halogenated components of a reaction mass of the type herein under consideration.

In the figure, a reactor 2, which may take any suitable form and which, of course, is preferably provided with means for applying heat thereto and is suitably fashioned of materials capable of withstanding the heats of reaction involved and the corrosive nature of the reactants to be contained therein, is suitably attached by a high temperature vapor line 3 to a condenser-absorber 4 into which the products of reaction from the reactor 2 are delivered. Condenser 4 may suitably be provided as, for example, through line 20 with means for introducing a halogenatable organic liquid of a type to be described more fully hereinafter. Preferably the organic liquid contained in condenser 4 is maintained at a sufficiently high level to submerge the delivery end of the vapor delivery line 3 from reactor 2. The organic liquid-chlorinated metal mixture from condenser 4 may suitably be delivered as by line 5 to separator 6, wherein any solids are permitted to settle in any convenient manner and are removed through line 7. The liquid portion of the mixture in solid separator 6 is delivered to evaporator 8 where the various relatively low boiling halogenated inorganic materials are vaporized off to rectifier 12 and any further separation necessary is effected at that point. It will be observed that where only one product soluble in the chosen organic solvent has been separated, no further treatment is necessary. The thus-stripped organic liquid from the evaporator 8 is conveniently returned to a cooler 10 where the organic material may be cooled, preferably to a point below about 50° C., and when so cooled is recycled through line 13 to condenser 4, thus promoting the formation of large crystals of the relatively high boiling inorganic halide materials in the condenser 4.

As an example of the relative flexibility of the method of the present invention, this apparatus may alternately be operated as indicated by the dotted line 18, which is an alternate to the line 13 from cooler 10 to condenser 4. The dotted line 18 goes to the stack line 16 through which non-condensible gases from condenser 4 escape and by routing the returning organic solvent through line 18 and stack line 16, the organic liquid returning to the condenser 4 may be used to scrub the escaping non-condensible gases and to remove therefrom any materials of value which may have been entrained into the stack from the condenser 4.

As has been noted above, in the course of the reaction the halogenation agents from the reactor 2 will escape through line 3 into condenser 4 and effect the halogenation of the organic liquid used for the purpose of separation, as described above. If it is desired to recover this halogenated organic material for purposes as will be set forth below, or in the event that the halogenatable organic material becomes so highly halogenated as to lack some of the efficiency as a separation medium which it possesses when the reaction is commenced, then this material may be removed from the cooler 10 through the trap 11 and additional halogenatable organic material added through the line 20 to compensate for the material removed.

It will be appreciated that the extent to which cooling is necessary in the cooler 10 will depend to some extent upon the nature of the organic solvent originally chosen for the purpose. Thus, as will easily be understood by those skilled in the art, those organic solvents having relatively low boiling points will have to be substantially cooled, possibly by refrigeration, in the cooler 10. Furthermore, in the case of employing a relatively low boiling organic material which may be desirably used especially where the boiling point of the desired halide or halides is relatively high, it may be convenient to vaporize the solvent rather than the solute in evaporator 8, in which case cooler 10 will be employed as a condenser and cooler. For example, in the case of manufacture of silicon tetrachloride from silicon alloy, such as ferro-silicon, or crude silicon metal, chlorine gas may be used as the halogenation agent, silicon tetrachloride being the principal product. In such case a hydrocarbon, either aliphatic or aromatic and having a substantially higher boiling point than silicon tetrachloride, such as toluene or kerosene, is preferably employed as the halogenatable organic solvent. The silicon tetrachloride may conveniently be vaporized from the solvent in evaporator 8 and extreme conditions of cooling in cooler 10 will not be required. Where crude tin, for example, is used as a raw material in the reactor and chlorine gas is again employed as the halogenation agent, stannic chloride being the principal product, a hydrocarbon of substantially lower boiling point, either aliphatic or aromatic, such as petroleum ether or benzene, may be used and may be vaporized from the stannic chloride in evaporator 8. In such case somewhat more efficient cooling in cooler 10 to effect condensation of the lower boiling solvent is preferable, as noted above.

The design and materials of the various instrumentalities, employed in accordance with the disclosed method, will be apparent from consideration of the reactants involved and products obtained. Thus, the reactor 2 may be of any suitable type for the particular raw materials and the particular halogenation agent to be used, such as, for example, an externally cooled iron or copper reactor when used with alloys or the crude elements, or a refractory lined reactor where extremely high temperatures are necessary, as, for example, in the halogenation of compositions, such as silicon carbide, clays, ores, and the like. The solid liquid separator 6 may be a simple filter, a centrifuge, or a settling basin, the function thereof being effectually to separate the solid and liquid phases. The evaporator 8 may be of any conventional design suitable for the materials to be handled, it being necessary only to heat the liquid effluent from the solid liquid separator to a temperature sufficient to vaporize either the contacting organic liquid medium or the liquid halide material therefrom. The cooler may be of any suitable design for the function required and for the materials to be handled, the temperature range of its effluent returning to the condenser chamber 4 generally being between about 20° and about 60° C. The rectifier is, of course, of a design such as will readily separate desired purified halide materials where there is more than one. When only one liquid inorganic halide compound is to be recovered, the rectifier may be combined with the evaporator in the form of a simple still, the function then being merely to separate the entrained liquid from condenser 4 from the single inorganic liquid halide.

The following are offered as specific examples of the method of this invention, it being understood that the same are to be construed as illustrative only.

*Example I*

A charge of dry ferro-silicon containing about 86.5% Si, the remainder being iron with small quantities of a large number of impurities, is placed in reactor 2. A paraffinic hydrocarbon, having an average molecular weight corresponding to a saturated $C_{13}$ hydrocarbon and boiling in the range 188° to 256° C. at atmospheric pressure, is charged to the condenser 4. The level of the liquid in condenser 4 is adjusted so as to immerse the terminus of the conduit from reactor 2 to give an initial scrubbing of the gas stream issuing therefrom. After heating the reactor 2 and contents to about 300° C., dry chlorine gas is passed into the reactor; as soon as the reaction has started (as noted by the presence of ferric chloride in the hydrocarbon in condenser 4), further external heating is stopped and the reaction proceeds by means of the heat of formation of the various halide compounds. Ferric chloride and silicon tetrachloride are condensed and absorbed in the liquid medium in the condenser 4 and the mixture passes to the liquid solid separator 6 wherein substantially all of the ferric chloride precipitates. The liquid phase, substantially free of ferric chloride, passes from the separator to the evaporator 8 which is maintained at a temperature above the boiling point of silicon tetrachloride but below the boiling range of the hydrocarbon. Silicon tetrachloride vapor is evolved in the evaporator and passes to rectifier 12 where it is separated from any entrained condenser liquid, condensed to a liquid and collected. The condenser liquid in the evaporator, substantially free of silicon tetrachloride, passes to the cooler 10 wherein it is cooled to about 40° C. and is returned to condenser 4 to complete the cycle. Silicon tetrachloride obtained as the condensate from rectifier 12 is clear, colorless, and contains no detectable amount of dissolved free chlorine. The condenser liquid is continuously or intermittently withdrawn as desired during extended periods of operation and that which is withdrawn is replaced by more of the original hydrocarbon material.

*Example II*

An iron and tin bearing ore is mixed with an amount of carbon in slight excess of that required to chemically react with the oxygen content thereof, briquetted, and charged to a suitably lined cylindrical steel reactor. After heating the reactor and contents to about 900° C., chlorine gas is charged to the reactor at a rate sufficient to cause the reactions taking place therein to maintain substantially this temperature during the operation and external sources of heat to the charge are cut off.

The reaction products in vapor form pass to an absorber-condenser wherein the chlorides of iron and tin are condensed and absorbed in benzene, the heterogeneous vapor reaction mixture being introduced below the level of the benzene body. Vapors comprising carbon dioxide and carbon monoxide are vented preferably after scrubbing with benzene, as described in Example I. The mixture comprising benzene, stannic chloride, and ferric chloride passes to a solid-liquid separator wherein the ferric chloride is separated and removed. The liquid phase comprising benzene and stannic chloride then passes to an evaporator and benzene is vaporized therefrom and passes to a condenser. Stannic chloride with some benzene and some phenyl chloride passes to a rectifier and is separated by fractional distillation. The condensed benzene leaving the condenser is returned to the absorber, preferably scrubbing the stack vapors therefrom, as described in Example I above.

The free chlorine present in the vapors issuing from the reactor, especially at the start of the chlorination reaction or when the temperature of the charge falls below that required to sustain the reaction in the presence of ferric chloride, combines with benzene to form phenyl chloride. The rectified stannic chloride obtained is a colorless, clear liquid and contains substantially no dissolved free chloride.

Those skilled in the art will appreciate that the herein described method may be applied to other halogens, such as fluorine, bromine or iodine. Also it will be appreciated that in addition to elemental halogens, halogen yielding compounds such as phosgene, carbon tetrachloride and mercuric chloride may be used. In addition, the method of the invention is particularly applicable to those halides of groups III and IV which are appreciably soluble in organic hydrocarbon solvents, such halides including boron and all of the group IV elements.

It will further be understood that substances, such as soap or finely divided metal, may be added to the absorber-condenser organic liquid to remove specific volatile impurities, for example, to remove volatile vanadium compounds formed during a halogenation of titanium ores. It is, of course, obvious in carrying out this method of separation that such additive substances should react with specific undesired components only while remaining chemically indifferent to any and all of the desired components of the reaction mixture.

The halogen compounds separated as insoluble solids in the liquid-solid separator may be either discarded or removed therefrom for further separation and purification by conventional methods. Instead of the so-called alloy ferro-silicon, I may use a clay or other mineral, mixed with carbon in slight excess of the amount sufficient to react with the combined oxygen in the mineral, or I may use the crude elements or physical mixtures of the elements, or element compounds yielding at least one component which is an inorganic halide material soluble in the absorbing organic liquid medium. In place of the hydrocarbons mentioned above, I may use any convenient halogenatable petroleum hydrocarbon fraction having a boiling range between or above the boiling points of the halogenated materials to be separated and including hydrocarbons such as toluene, xylene, petroleum ether, cetane, or liquid olefinic compounds such as pentene, hexene, heptene, octene, or mixtures thereof, or higher molecular weight olefinic hydrocarbon substances. It is necessary only that the material be liquid at the temperature and pressure of operation. It is preferable that whatever the liquid material, it be of such a chemical nature as to react readily under the conditions of operation with any of the halogenation agent carried over in the vapor stream from the reactor. The material thus halogenated is removed continuously or intermittently, as noted herein above, and may be used as an intermediate in a variety of organic chemical syntheses, such as in Friedel-Crafts, Wurtz, Grignard or like reactions, or it may be advantageously converted to an olefinic compound by a dehydrohalogenation reaction, such as by reaction with an alkali metal hydroxide in the presence of an alcohol.

It is preferable that the distance through which the vapor stream must travel from the reactor to the condenser-absorber be short in order that it may be kept at a sufficiently high temperature to maintain substantially all of the inorganic halide materials issuing from the reactor in vapor form. If relatively long distances of travel for the vapor stream are necessary, external heating may be applied in this region of the structure to prevent substantial condensation of any of the halides. It is likewise preferable that the conduit connecting the reactor with the condenser-absorber chamber exhaust the vapor stream beneath the surface of the liquid contained in the condenser-absorber chamber, since this will advantageously allow for the immediate condensation of any ferric chloride and/or aluminum chloride, as well as other normally hydrocarbon insoluble components of the reaction mixture, and will eliminate troublesome plugging of the vent line for non-condensible gases.

It is readily observed that the system may be operated at substantial pressure above atmospheric pressure, or at atmospheric pressure, or at less than atmospheric pressure, depending upon the volatility of the soluble inorganic halides obtained and the volatility of the halogenatable solvent used as the absorbing liquid for the reaction products.

While I have described in detail certain forms of my invention and certain specific examples of its practice, I do not wish to be understood as limiting myself to the use of such examples as I realize that changes within the scope of the invention are possible, and I further intend each step in the following claims to refer to all equivalent steps for accomplishing the same result in substantially the same or equivalent manner, it being my purpose to cover my invention broadly in whatever form its principle may be utilized.

What is claimed is:

1. The method of obtaining a purified halogen compound of an element selected from the group consisting of group IV elements and boron, which includes the steps of contacting a raw material containing such element and impurities, at least some of which are halogenatable with elemental halogen, under reaction conditions to produce a mixed reaction product containing the vaporized halide of such element, vaporized halides of impurities, and residual free halogen, contacting said mixture with a liquid hydrocarbon solvent, halogenatable by free halogen, having a preferential solubility for said compound and being chemically indifferent to said products of reaction under halogenation conditions for said solvent, to dissolve the halide of said element, precipitate the halides of impurities, and halogenate said solvent with said residual halogen, separating the solid undissolved halides of impurities from said mixture, and distilling the remaining liquid mixture to isolate the halide of said element.

2. The method of obtaining a purified chlorine compound of an element selected from the group consisting of group IV elements and boron, which includes the steps of contacting a raw material containing such element and impurities, at least some of which are chlorinatable with elemental chlorine, under reaction conditions to produce a mixed reaction product containing the vaporized chloride of such element, vaporized chlorides of impurities, and residual free chlorine, contacting said mixture with a liquid hydrocarbon solvent, chlorinatable by free chlorine, having a preferential solubility for said compound and being chemically indifferent to said products of reaction under chlorination conditions for said solvent, to dissolve the chloride of said element, precipitate the chlorides of impurities, and chlorinate said solvent with said residual chlorine, separating the solid undissolved chlorides of impurities from said mixture, and distilling the remaining liquid mixture to isolate the chloride of said element.

3. The method of preparing a silicon tetrahalide, which includes the steps of halogenating a mixture of silicon and impurities to obtain a vaporized reaction product comprising silicon tetrahalide, halides of said impurities and unreacted halogen, contacting said reaction product in vaporized form with a liquid organic hydrocarbon solvent, which is readily halogenatable by free halogen, chemically indifferent to the inorganic halides in the system under halogenation conditions for said solvent, has preferential solubility for silicon tetrahalide, and which has a boiling point substantially different from said silicon tetrahalide, to dissolve said silicon tetrahalide, precipitate halides of said impurities, and halogenate said solvent, separating said precipitated components from said mixture, and separately recovering said silicon tetrahalide from said mixture.

4. The method of preparing silicon tetrachloride, which includes the steps of chlorinating a mixture of silicon and impurities to obtain a vaporized reaction product comprising silicon tetrachloride, chlorides of said impurities and unreacted chlorine, contacting said reaction product in vaporized form with a liquid organic hydrocarbon solvent, which is readily chlorinatable by free chlorine, chemically indifferent to the inorganic chlorides of the system under chlorination conditions for said solvent, has preferential solubility for silicon tetrachloride, and which has a boiling point substantially different from said silicon tetrachloride, to dissolve said silicon tetrachloride, precipitate chlorides of said impurities, and chlorinate said solvent, separating said precipitated components from said mixture, and separately recovering said silicon tetrachloride from said mixture.

5. The method of recovering silicon tetrachloride from a vaporous mixture comprising ferric chloride, chlorine, and silicon tetrachloride, which includes the steps of contacting said mixture with a liquid hydrocarbon solvent chosen from the group consisting of kerosene, having a boiling point intermediate that of silicon tetrachloride and ferric chloride and toluene at a temperature below the boiling point of said solvent, to chlorinate said solvent with said chlorine, dissolve said silicon tetrachloride in said solvent and precipitate said ferric chloride, removing said precipitated ferric chloride from said mixture of solvent, chlorinated solvent, and silicon tetrachloride, and heating said mixture to a temperature below its boiling point but above the boiling point of said silicon tetrachloride to vaporize silicon tetrachloride therefrom.

6. The method as claimed in claim 5 in which said solvent, upon having been separated from said silicon tetrachloride, is returned and contacted with further mixture of silicon tetrachloride, ferric chloride, and chlorine.

7. The method of recovering stannic chloride from a vaporous mixture including stannic chloride, ferric chloride, and chlorine, which includes the steps of contacting said mixture in its vapor form with a liquid organic hydrocarbon solvent which is chemically indifferent to the inorganic chlorides in said mixture, has preferential solubility for said stannic chloride, is readily chlorinatable by free chlorine in its liquid form, and which has a boiling point substantially different from said stannic chloride, to dissolve said stannic chloride in said solvent, precipitate said ferric chloride and chlorinate said solvent with said free chlorine, separating said precipitated components from said mixture, and separately recovering said stannic chloride from said mixture.

8. The method of recovering stannic chloride from a vaporous mixture of stannic chloride, ferric chloride, and chlorine, which includes the steps of contacting said mixture with a solvent in liquid form chosen from the group consisting of petroleum ether and benzene, to dissolve said stannic chloride, chlorinate said solvent with said chlorine, and precipitate said ferric chloride, removing said precipitate, and separately recovering said dissolved stannic chloride from said chlorinated solvent.

DICK M. WARBURTON.

REFERENCES CITED

The following references are of record in the file of this patent:

UNITED STATES PATENTS

| Number | Name | Date |
| --- | --- | --- |
| 856,753 | Acker | June 11, 1907 |
| 882,354 | Sperry | Mar. 17, 1908 |
| 1,277,329 | McAfee | Aug. 27, 1918 |
| 1,647,446 | Wolcott | Nov. 1, 1927 |
| 1,887,566 | Shiffler | Nov. 15, 1932 |
| 2,249,761 | Hixson | July 22, 1941 |
| 2,311,466 | Pechukas | Feb. 16, 1943 |

FOREIGN PATENTS

| Number | Country | Date |
| --- | --- | --- |
| 16,910 | Great Britain | of 1906 |
| 16,910A | Great Britain | of 1906 |